United States Patent [19]
Gong

[11] Patent Number: 6,151,573
[45] Date of Patent: Nov. 21, 2000

[54] SOURCE NORMALIZATION TRAINING FOR HMM MODELING OF SPEECH

[75] Inventor: Yifan Gong, Dallas, Tex.

[73] Assignee: Texas Instruments Incorporated, Dallas, Tex.

[21] Appl. No.: 09/134,775

[22] Filed: Aug. 15, 1998

Related U.S. Application Data

[60] Provisional application No. 60/059,180, Sep. 17, 1997.

[51] Int. Cl.[7] .................................................. G10L 15/14
[52] U.S. Cl. ........................... 704/256; 704/240; 704/234
[58] Field of Search ..................................... 704/236, 237, 704/239, 240, 243, 244, 255, 256, 233, 234

[56] References Cited

U.S. PATENT DOCUMENTS

| | | | |
|---|---|---|---|
| 5,222,146 | 6/1993 | Bahal et al. | 704/243 |
| 5,727,124 | 3/1998 | Lee et al. | 704/233 |

OTHER PUBLICATIONS

Anastasakos et al., A Compact Model for Speaker–Adaptive Training, BBN Systems and Technologies, pp. 1137–1140, Oct. 1996.

Jun Ishii and Masahiro Tonomura, "Speaker Normalization and Adaptation Based on Linear Transformation," Proceedings IEEE International Conference on Acoustics, Speech, and Signal Processing, vol. 2, 21–24, pp. 1055–1058, Apr. 1997.

Tasos Anastasakos et al., "A Compact Model for Speaker–Adaptive Training," Proceedings International Conference on Spoken Language Processing, vol. 2, 3–6, pp. 1137–1140, Oct. 1996.

Alejandro Acero et al., "Speaker and Gender Normalization for Continuous–Density Hidden Markov Models," Proceedings IEEE International Conference on Acoustics, Speech, and Signal Processing, vol. 1, 7–10, pp. 342–345, May 1996.

*Primary Examiner*—Forester W. Isen
*Assistant Examiner*—Abul K. Azad
*Attorney, Agent, or Firm*—Robert L. Troike; Frederick J. Telecky, Jr.

[57] ABSTRACT

A maximum likelihood (ML) linear regression (LR) solution to environment normalization is provided where the environment is modeled as a hidden (non-observable) variable. By application of an expectation maximization algorithm and extension of Baum-Welch forward and backward variables (Steps 23a–23d) a source normalization is achieved such that it is not necessary to label a database in terms of environment such as speaker identity, channel, microphone and noise type.

6 Claims, 3 Drawing Sheets

SOURCE NORMALIZATION TRAINING FOR HMM MODELING OF SPEECH

This application claims priority under 35 USC §119(e)(1) of provisional application No. 60/059,180, filed Sep. 17, 1997.

TECHNICAL FIELD OF THE INVENTION

This invention relates to training for HMM modeling of speech and more particularly to removing environmental factors from speech signal during the training procedure.

BACKGROUND OF THE INVENTION

In the present application we refer to environment as speaker, handset or microphone, transmission channel, noise background conditions, or combination of these as the environment. A speech signal can only be measured in a particular environment. Speech recognizers suffer from environment variability because trained model distributions may be biased from testing signal distributions because environment mismatch and trained model distributions are flat because they are averaged over different environments.

The first problem, the environmental mismatch, can be reduced through model adaptation, based on some utterances collected in the testing environment. To solve the second problem, the environmental factors should be removed from the speech signal during the training procedure, mainly by source normalization.

In the direction of source normalization, speaker adaptive training uses linear regression (LR) solutions to decrease inter-speaker variability. See for example, T. Anastasakos, et al. entitled, "A compact model for speaker-adaptive training," *International Conference on Spoken Language Processing*, Vol. 2, October 1996. Another technique models mean-vectors as the sum of a speaker-independent bias and a speaker-dependent vector. This is found in A. Acero, et al. entitled, "Speaker and Gender Normalization for Continuous-Density Hidden Markov Models," in *Proc. Of IEEE International Conference on Acoustics, Speech and Signal Processing*, pages 342–345, Atlanta, 1996. Both of these techniques require explicit label of the classes. For example, speaker or gender of the utterance during the training. Therefore, they can not be used to train clusters of classes, which represent acoustically close speaker, hand set or microphone, or background noises. Such inability of discovering clusters may be a disadvantage in application.

SUMMARY OF THE INVENTION

In accordance with one embodiment of the present invention, we provide a maximum likelihood (ML) linear regression (LR) solution to the environment normalization problem, where the environment is modeled as a hidden (non-observable) variable. An EM-Based training algorithm can generate optimal clusters of environments and therefore it is not necessary to label a database in terms of environment. For special cases, the technique is compared to utterance-by-utterance central mean normalization (CMN) technique and show performance improvement on a noisy speech telephone database.

In accordance with one embodiment of the present invention under maximum likelihood (ML) criterion, by application of EM algorithm and extension of Baum-Welch forward and backward variables and algorithm, we obtained joint solution to the parameters for the source normalization, i.e. the canonical distributions, the transformations and the biases.

These and other features of the invention that will be apparent to those skilled in the art from the following detailed description of the invention, taken together with the accompanying drawings.

DESCRIPTION OF PREFERRED EMBODIMENTS OF THE PRESENT INVENTION

Figure 1:
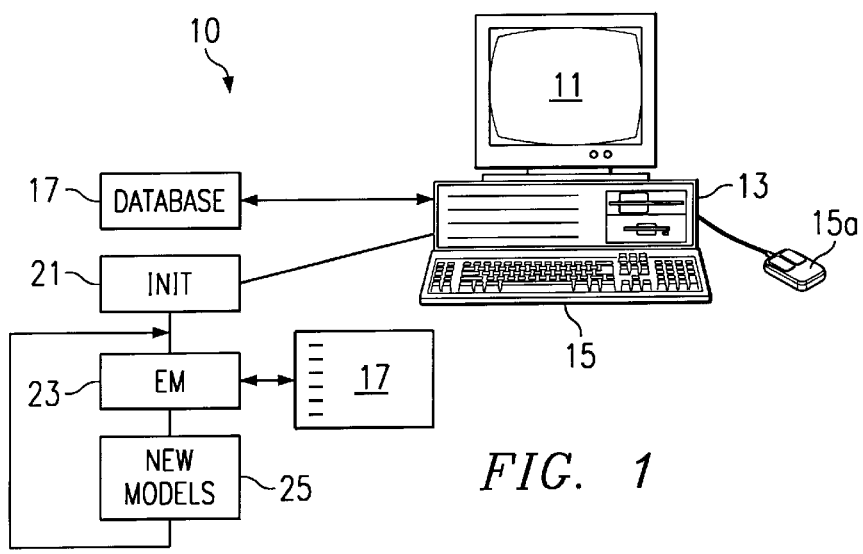
FIG. 1 is a block diagram of the system according to one embodiment of the present invention.

The training is done on a computer workstation which is illustrated in FIG. 1 having a monitor 11, a computer workstation 13, a keyboard 15, and a mouse or other interactive device 15*a* as shown in FIG. 1. The system maybe connected to a separate database represented by database 17 in FIG. 1 for storage and retrieval of models.

Figure 2:
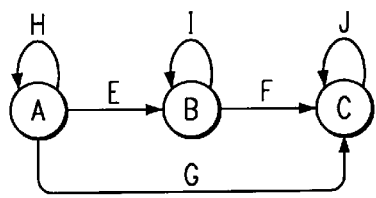
FIG. 2 illustrates a speech model.
Figure 3:
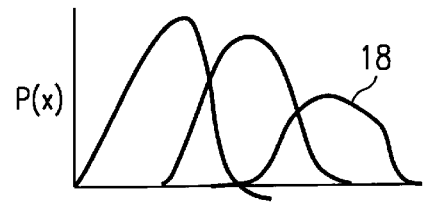
FIG. 3 illustrates a Gaussian distribution.

By the term "training" we mean herein to fix the parameters of the speech models according to an optimum criterion. In this particular case, we use HMM (Hidden Markov Models) models. These models are as represented in FIG. 2 with states A, B, and C and transitions E, F, G, H, I and J between states. Each of these states has a mixture of Gaussian distributions 18 represented by FIG. 3. We are training these models to account for different environments. By environment we mean different speaker, handset, transmission channel, and noise background conditions. Speech recognizers suffer from environment variability because trained model distributions may be biased from testing signal distributions because of environment mismatch and trained model distributions are flat because they are averaged over different environments. For the first problem, the environmental mismatch can be reduced through model adaptation, based on utterances collected in the testing environment. Applicant's teaching herein is to solve the second problem by removing the environmental factors from the speech signal during the training procedure. This is source normalization training according to the present invention. A maximum likelihood (ML) linear regression (LR) solution to the environmental problem is provided herein where the environment is modeled as hidden (non observable) variable.

Figure 4:
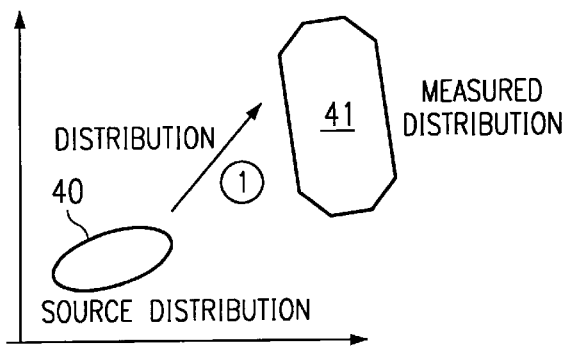
FIG. 4 illustrates distortions in the distribution caused by different environments.

A clean speech pattern distribution 40 will undergo complex distortion with different environments as shown in FIG. 4. The two axes represent two parameters which may be, for example, frequency, energy, format, spectral, or cepstral components. The FIG. 4 illustrates a change at 41 in the distribution due to background noise or a change in speakers. The purpose of the application is to model the distortion.

The present model assumes the following: 1) the speech signal x is generated by Continuous Density Hidden Markov Model (CDHMM), called source distributions; 2) before being observed, the signal has undergone an environmental transformation, drawn from a set of-transformations, where $W_{je}$ be the transformation on the HMM state j of the environment e; 3) such a transformation is linear, and is independent of the mixture components of the source; and 4) there is a bias vector $b_{ke}$ at the k-th mixture component due to environment e.

What we observe at time t is:

$$o_t = W_{je} x_t + b_{ke} \quad (1)$$

Our problem now is to find, in the maximum likelihood (ML) sense, the optimal source distributions, the transformation and the bias set.

In the prior art (A. Acero, et al. cited above and T. Anastasakos, et al. cited above), the environment e must be explicit, e.g.: speaker identity, male/female. This work overcomes this limitation by allowing an arbitrary number of environments which are optimally trained.

Let N be the number of HMM states, M be the mixture number, L be the number of environments, $\Omega_s \triangleq \{1, 2, \ldots N\}$ be the set of states $\Omega_m \triangleq \{1, 2, \ldots M\}$ be the set of mixture indicators, and $\Omega_e \triangleq \{1, 2, \ldots L\}$ be the set of environmental indicators.

For an observed speech sequence of T vectors: $O \triangleq o_1^T \triangleq (o_1, o_2, \ldots o_T)$, we introduce state sequence $\Theta \triangleq \{\theta_o, \ldots \theta_T\}$ where $\theta_t \in \Omega_s$, mixture indicator sequence $\Xi \triangleq (\xi_1, \ldots \xi_t)$ where $\xi_T \in \Omega_m$, and environment indicator sequence $\Phi \triangleq (\phi_1, \ldots \phi_T)$ where $\phi_t \in \Omega_e$. They are all unobservable. Under some additional assumptions, the joint probability of O, $\Theta$, $\Xi$, and $\Phi$ given model $\lambda$ can be written as:

$$p(O, \Theta, \Xi, \Phi | \lambda) = u_{\theta_1} \prod_{t=1}^{T} c_{\theta_t \xi_t} b_{\theta_t \xi_t \varphi}(o_t) a_{\theta_t \theta_{t+1}} l_\varphi \quad (2)$$

where $$b_{jke}(o_t) \triangleq p(o_t | \theta_t = j, \xi_t = k, \phi = e, \lambda) \quad (3)$$

$$= N\left(o_t; W_{je}\mu_{jk} + b_{ke}, \sum_{jk}\right), \quad (4)$$

$$u_i \triangleq p(\theta_1 = i), a_{ij} \triangleq p(\theta_{t+1} = j | \theta_t = i) \quad (5)$$

$$c_{jk} \triangleq p(\xi_t = k | \theta_t = j, \lambda), l_e \triangleq p(\phi = e | \lambda) \quad (6)$$

Referring to FIG. 1, the workstation 13 including a processor contains a program as illustrated that starts with an initial standard HMM model 21 which is to be refined by estimation procedures using Baum-Welch or Estimation-Maximization procedures 23 to get new models 25. The program gets training data at database 19 under different environments and this is used in an iterative process to get optimal parameters. From this model we get another model 25 that takes into account environment changes. The quantities are defined by probabilities of observing a particular input vector at some particular state for a particular environment given the model.

The model parameters can be determined by applying generalized EM-procedure with three types of hidden variables: state sequence, mixture component indicators, and environment indicators. (A. P. Dempster, N. M. Laird, and D. B. Rubin, entitled "Maximum Likelihood from Incomplete Data via the EM Algorithm," *Journal of the Royal Statistical Society*, 39 (1): 1–38, 1977.) For this purpose, Applicant teaches the CDHMM formulation from B, Juang, "Maximum-Likelihood Estimation for Mixture Multivariate Stochastic Observation of Markov Chains" (*The Bell System Technical Journal,* pages 1235–1248, July–August 1985) to be extended to result in the following paragraphs: Denote:

$$\alpha_t(j, e) \triangleq p(o_1^t, \theta_t = j, \phi = e | \bar{\lambda}) \quad (7)$$

$$\beta_t(j, e) \triangleq p(o_{t+1}^T | \theta_t = j, \phi = e, \bar{\lambda}) \quad (8)$$

$$\gamma_t(j, k, e) \triangleq p(\theta_t = j, \xi_t = k, \phi = e | O, \bar{\lambda}) \quad (9)$$

The speech is observed as a sequence of frames (a vector). Equations 7, 8, and 9 are estimations of intermediate quantities. For example, in equation 7 is the joint probability of observing the frames from times 1 to t at the state j at time t and for the environment of e given the model $\lambda$.

The following re-estimation equations can be derived from equations 2, 7, 8, and 9.

For the EM procedure 23, equations 10–21 are solutions for the quantities in the model.

Initial state probability:

$$u_i = \frac{1}{R} \sum_{r=1}^{R} \frac{\sum_{e \in \Omega_e} a_1^r(i, e) \beta_1^r(i, e)}{\sum_{i \in \Omega_s} \sum_{e \in \Omega_e} a_1^r(i, e) \beta_1^r(i, e)} \quad (10)$$

with R the number of training tokens.

Transition probability:

$$a_{ij} = \frac{\bar{a}_{ij} \sum_{r=1}^{R} \frac{1}{p(O^r | \bar{\lambda})} \sum_{e \in \Omega_e} \sum_{t=1}^{T^r} \alpha_t^r(i, e) b_{j,e}(o_{t+1}^r) \beta_{t+1}^r(j, e)}{\sum_{r=1}^{R} \frac{1}{p(O^r | \bar{\lambda})} \sum_{e \in \Omega_e} \sum_{t=1}^{T^r} \alpha_t^r(i, e) \beta_t^r(i, e)} \quad (11)$$

Mixture Component probability: (Mixture probability is where there is a mixture of Gaussian distributions)

$$c_{jk} = \frac{\sum_{r=1}^{R} \sum_{e \in \Omega_e} \sum_{t=1}^{T^r} \gamma_t^r(j, k, e)}{\sum_{r=1}^{R} \frac{1}{p(O^r | \bar{\lambda})} \sum_{e \in \Omega_e} \sum_{t=1}^{T^r} \alpha_t^r(j, e) \beta_t^r(j, e)} \quad (12)$$

Environment probability:

$$l_e = \frac{1}{R} \sum_{r=1}^{R} \frac{\sum_{j \in \Omega_s} \alpha_T^r(j, e)}{\sum_{e \in \Omega_e} \sum_{j \in \Omega_s} \alpha_T^r(j, e)} \quad (13)$$

Mean vector and bias vector: We introduce:

$$\rho(j, k, e) \triangleq \sum_{r=1}^{R} \sum_{t=1}^{T^r} \gamma_t^r(j, k, e) o_t^r \quad (14)$$

$$g(j, k, e) \triangleq \sum_{r=1}^{R} \sum_{t=1}^{T^r} \gamma_t^r(j, k, e) \quad (15)$$

and

-continued $$G_{ke} = \sum_{j \in \Omega_s} g(j,k,e) \sum_{jk}^{-1} \quad (16)$$

$$E_{jke} = g(j,k,e) W'_{je} \sum_{jk}^{-1} \quad (17)$$

$$F_{jk} = \sum_{e \in \Omega_e} E_{jke} W_{je} \quad (18)$$

$$a_{jk} = \sum_{e \in \Omega_e} W'_{je} \sum_{jk}^{-1} \rho(j,k,e) \quad (19)$$

$$c_{ke} = \sum_{j \in \Omega_s} \sum_{jk}^{-1} \rho(j,k,e). \quad (20)$$

Assuming $W_{je} = \overline{W}_{je}$ and $$\sum_{jk}^{-1} = \overline{\sum}_{jk}^{-1},$$

for a given k, we have N+L equations:

$$\sum_{e \in \Omega_e} E_{jke} b_{ke} + F_{jk} \mu_{jk} = a_{jk} \quad \forall j \in \Omega_s \quad (21)$$

$$G_{ke} b_{ke} + \sum_{j \in \Omega_s} H_{jke} \mu_{jk} = c_{ke} \quad \forall e \in \Omega_e \quad (22)$$

These equations 21 and 22 are solved jointly for mean vectors and bias vectors.

Therefore $\mu_{jk}$ and $b_{ke}$ can be simultaneously obtained by solving the linear system of N+L variables.

Covariance:

$$\sum_{jk} = \frac{\sum_{e \in \Omega_e} \sum_{r=1}^{R} \sum_{t=1}^{T^r} \gamma_t^r(j,k,e) \delta_t^r(j,k,e) \delta_t^r(j,e,k)'}{\sum_{e \in \Omega_e} g(j,k,e)} \quad (23)$$

where $\delta_t^r(j,k,e) \triangleq o_t^r - W_{je}\mu_{jk} - b_{ke}$

Transformation: We assume covariance matrix to be diagonal:

$$\sum_{jk}^{-1(m,n)} = 0 \quad \text{if } n \neq m.$$

For the line m of transformation $W_{je}$, we can derive (see for example C. J. Leggetter, et al., entitled "Maximum Likelihood Linear Regression for Speaker Adaptation of Continuos Density HMMs" *Computer, Speech and Language*, 9(2): 171–185, 1995.):

$$Z_{je}^{(m)} = W_{je}^{(m)} R_{je}(m) \quad (24)$$

which is a linear system of D equations, where:

$$Z_{je}^{(m,n)} \triangleq \sum_{k \in \Omega_m} \sum_{jk}^{-1(m,n)} \mu_{jk}^{(n)} \sum_{r=1}^{R} \sum_{t=1}^{T^r} \gamma_t^r(j,k,e)(o_t^r - b_{ke})^{(m)} \quad (25)$$

$$R_{je}^{(p,n)}(m) \triangleq \sum_{k \in \Omega_m} \sum_{jk}^{-1(m,n)} \mu_{jk}^{(p)} \mu_{jk}^{(n)} \sum_{r=1}^{R} \sum_{t=1}^{T^r} \gamma_t^r(j,k,e). \quad (26)$$

Assume the means of the source distributions ($\mu_{jk}$) are constant, then the above set of source normalization formulas can also be used for model adaptation.

The model is specified by the parameters. The new model is specified by the new parameters.

Figure 5A:
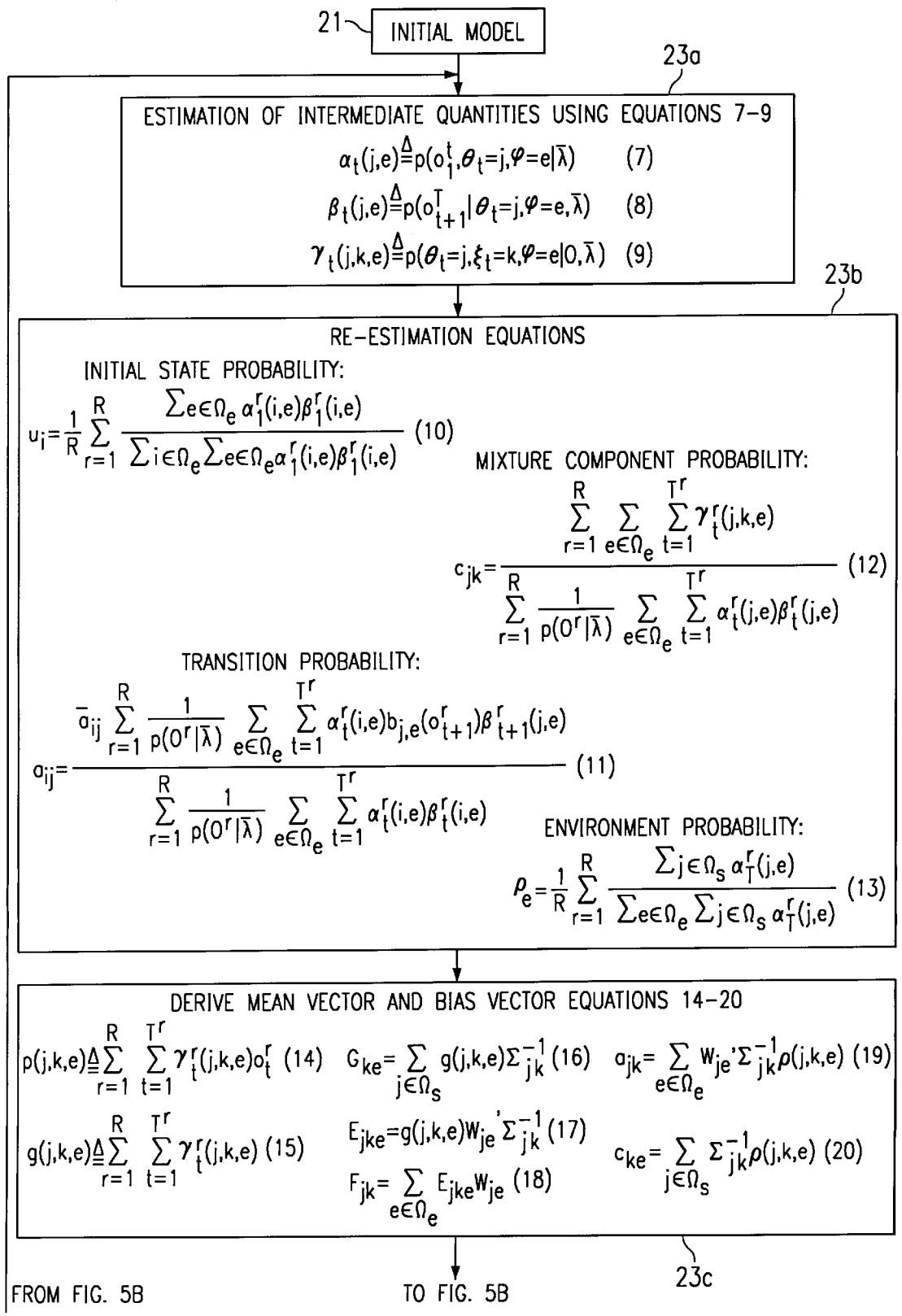
FIG. 5 is a more detailed flow diagram of the process according to one embodiment of the present invention.
Figure 5B:
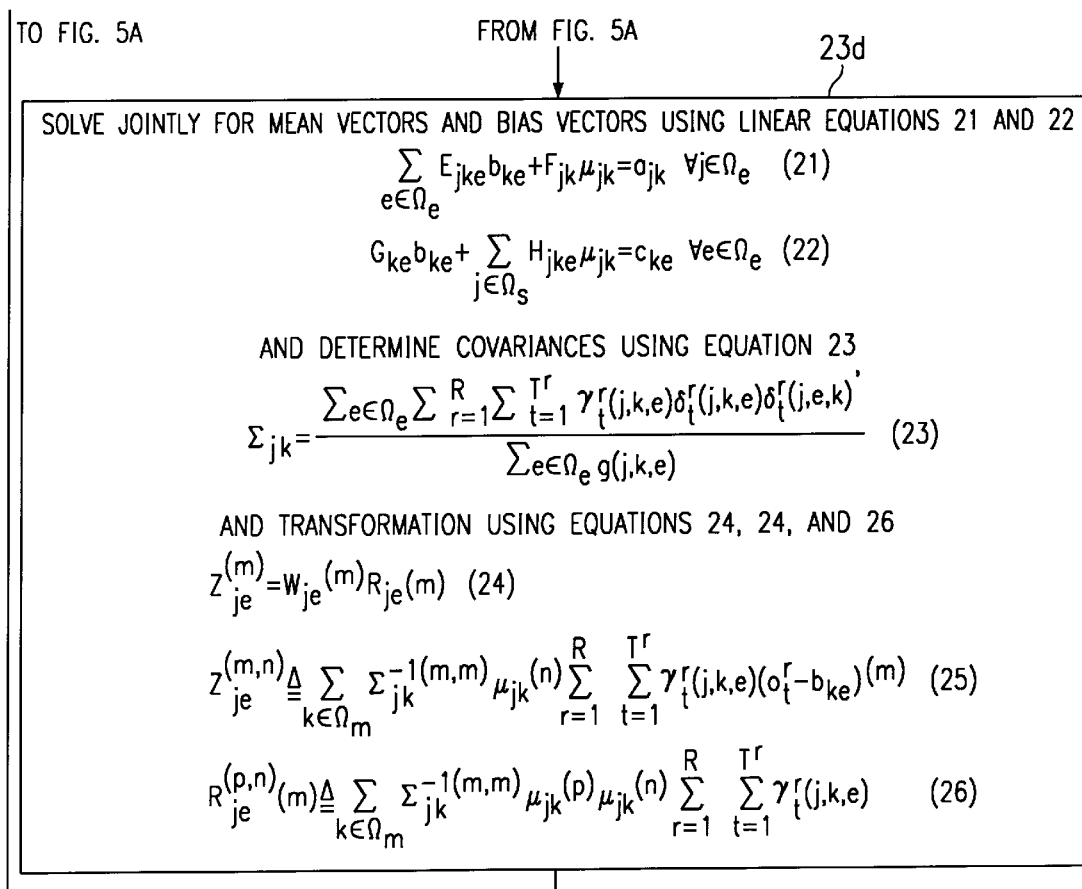
Figure 5B:
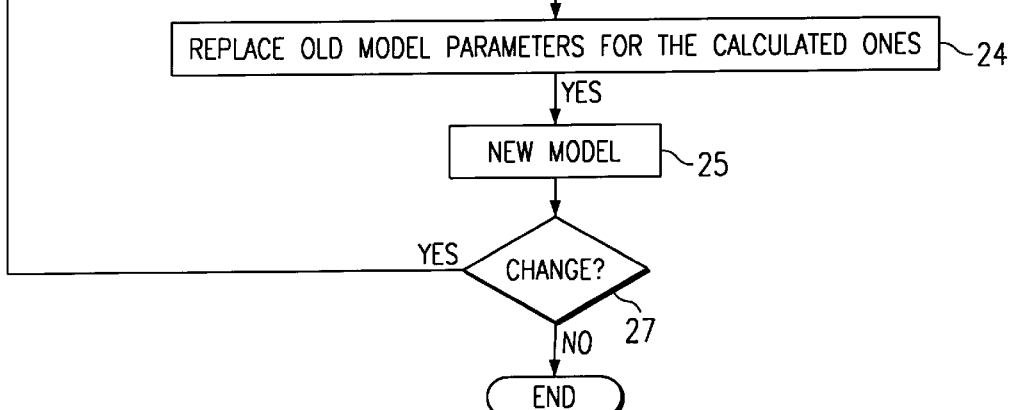

As illustrated in FIGS. 1 and 5, we start with an initial as standard model 21 such as the CDHMM model with initial values. This next step is the Estimation Maximization 23 procedure starting with (Step 23a) equations 7–9 and re-estimation (Step 23b) equations 10–13 for initial state probability, transition probability, mixture component probability and environment probability.

The next step (23c) to derive means vector and bias vector by introducing two additional equations 14 and 15 and equation 16–20. The next step 23a is to apply linear equations 21 and 22 and solve 21 and 22 jointly for mean vectors and bias vectors and at the same time calculate the variance using equation 23. Using equation 24 which is a system of linear equations will solve for transformation parameters using quantities given by equation 25 and 26. Then we have solved for all the model parameters. Then one replaces the old model parameters by the newly calculated ones (Step 24). Then the process is repeated for all the frames. When this is done for all the frames of the database a new model is formed and then the new models are re-evaluated using the same equation until there is no change beyond a predetermined threshold (Step 27).

Figure 6:
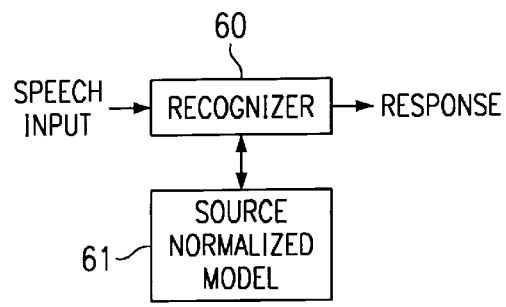
FIG. 6 is a recognizer according to an embodiment of the present invention using a source normalization model.

After a source normalization training model is formed, this model is used in a recognizer as shown in FIG. 6 where input speech is applied to a recognizer 60 which used the source normalized HMM model 61 created by the above training to achieve the response.

The recognition task has 53 commands of 1–4 words. ("call return", "cancel call return", "selective call forwarding", etc.). Utterances are recorded through telephone lines, with a diversity of microphones, including carbon, electret and cordless microphones and hands-free speaker-phones. Some of the training utterances do not correspond to their transcriptions. For example: "call screen" (cancel call screen), "matic call back" (automatic call back), "call tra" (call tracking).

The speech is 8 kHz sampled with 20 ms frame rate. The observation vectors are composed of LPCC (Linear Prediction Coding Coefficients) derived 13-MFCC (Mel-Scale Cepstral Coefficients) plus regression based delta MFCC. CMN is performed at the utterance level. There are 3505 utterances for training and 720 for speaker-independent testing. The number of utterances per call ranges between 5–30.

Because of data sparseness, besides transformation sharing among states and mixtures, the transformations need to be shared by a group of phonetically similar phones. The grouping, based on an hierarchical clustering of phones, is dependent on the amount of training (SN) or adaptation (AD) data, i.e., the larger the number of tokens is, the larger the number of transformations. Recognition experiments are run on several system configurations:

BASELINE applies CMN utterance-by-utterance. This simple technique will remove channel and some long term speaker specificities, if the duration of the utterance is long enough, but can not deal with time domain additive noises.

SN performs source-normalized HMM training, where the utterances of a phone-call are assumed to have been generated by a call-dependent acoustic source. Speaker, channel and background noise that are specific to the call is then removed by MLLR. An HMM recognizer is then applied using source parameters. We evaluated a special case, where each call is modeled by one environment.

AD adapts traditional HMM parameters by unsupervised MLLR. 1. Using current HMMs and task grammar to phonetically recognize the test utterances, 2. Mapping the phone labels to a small number (N) of classes, which depends on the amount of data in the test utterances, 3. Estimating the LR using the N-classes and associated test data, 4. Recognizing the test utterances with transformed HMM. A similar procedure has been introduced in C. J. Legetter and P. C. Woodland. "Maximum likelihood linear regression for speaker adaptation of continuous density HMMs." *Computer, Speech and Language,* 9(2):171–185, 1995.

SN+AD refers to AD with initial models trained by SN technique.

Based on the results summarized in Table 1, we point out:

For numbers of mixture components per state smaller than 16, SN, AD, and SN+AD all give consistent improvement over the baseline configuration.

For numbers of mixture components per state smaller than 16, SN gives about 10% error reduction over the baseline. As SN is a training procedure which does not require any change to the recognizer, this error reduction mechanism immediately benefits applications.

For all tested configurations, AD using acoustic models trained with SN procedure always gives additional error reduction.

The most efficient case of SN+AD is with 32 components per state, which reduces error rate by 23%, resulting 4.64% WER on the task.

TABLE 1

Word error rate (%) as function of test configuration and number of mixture components per state.

|  | 4 | 8 | 16 | 32 |
|---|---|---|---|---|
| baseline | 7.85 | 6.94 | 6.83 | 5.98 |
| SN | 7.53 | 6.35 | 6.51 | 6.03 |
| AD | 7.15 | 6.41 | 5.61 | 5.87 |
| SN + AD | 6.99 | 6.03 | 5.41 | 4.64 |

Although the present invention and its advantages have been described in detail, it should be understood that various changes, substitutions and alterations can be made herein without departing from the spirit and scope of the invention as defined by the appended claims.

What is claimed is:

1. An improved speech recognition system comprising:
   a speech recognizer; and
   a source normalization model coupled to said recognizer; said model derived by a method of source normalization training for HMM modeling of speech comprising the steps of:
   (a) providing an initial model;
   (b) on said initial model or following new models performing the following steps to get a new model:
      $b_1$) estimation of intermediate quantities;
      $b_2$) performing re-estimation to determine initial state probability, transition probability, mixture component probability and environment probability;
      $b_3$) deriving mean vector and bias vector;
      $b_4$) solving jointly for mean vector and bias vector using linear equations and determining variances and transformation;
      $b_5$) replacing old model parameters for the calculated ones; and
   (c) determining after a new model is formed if it differs significantly from the previous model and if so repeating steps $b_1$–$b_5$.

2. The method of claim 1 wherein in step $b_1$ estimation intermediate quantities is determined by $\alpha_t(j,e) \underline{\Delta} p(o_1^t, \theta_t = j, \phi = e | \bar{\lambda})$,
$\beta_t(j,e) \underline{\Delta} p(o_{t+1}^T | \theta_t = j, \phi = e, \bar{\lambda})$, and $\gamma_t(j,k,e) \underline{\Delta} p(\theta_t = j, \xi_t = k, \phi = e | O, \bar{\lambda})$.

3. The method of claim 2 wherein step $b_2$ the initial state probability is determined by $$u_i = \frac{1}{R} \sum_{r=1}^{R} \frac{\sum_{e \in \Omega_e} \alpha_1^r(i,e)\beta_1^r(i,e)}{\sum_{i \in \Omega_s} \sum_{e \in \Omega_e} \alpha_1^r(i,e)\beta_1^r(i,e)},$$

transition probability is determined by $$a_{ij} = \frac{\bar{a}_{ij} \sum_{r=1}^{R} \frac{1}{p(O^r | \bar{\lambda})} \sum_{e \in \Omega_e} \sum_{t=1}^{T^r} \alpha_t^r(i,e) b_{j,e}(o_{t+1}^r) \beta_{t+1}^r(j,e)}{\sum_{r=1}^{R} \frac{1}{p(O^r | \bar{\lambda})} \sum_{e \in \Omega_e} \sum_{t=1}^{T^r} \alpha_t^r(i,e) \beta_t^r(i,e)},$$

mixture component probability is determined by $$c_{jk} = \frac{\sum_{r=1}^{R} \sum_{e \in \Omega_e} \sum_{t=1}^{T^r} \gamma_t^r(j,k,e)}{\sum_{r=1}^{R} \frac{1}{p(O^r | \bar{\lambda})} \sum_{e \in \Omega_e} \sum_{t=1}^{T^r} \alpha_t^r(j,e) \beta_t^r(j,e)},$$

and environment probability is determined by $$l_e = \frac{1}{R} \sum_{r=1}^{R} \frac{\sum_{j \in \Omega_s} \alpha_T^r(j,e)}{\sum_{e \in \Omega_e} \sum_{j \in \Omega_s} \alpha_T^r(j,e)}.$$

4. The method of claim 2 wherein step $b_3$ deriving mean vector and bias vector is determined by $$\rho(j,k,e) \overset{\Delta}{=} \sum_{r=1}^{R} \sum_{t=1}^{T^r} \gamma_t^r(j,k,e) o_t^r;$$

-continued $$g(j,k,e) \triangleq \sum_{r=1}^{R}\sum_{t=1}^{T^r}\gamma_t^r(j,k,e),$$

$$G_{ke} = \sum_{j\in\Omega_s} g(j,k,e)\sum_{jk}^{-1},$$

$$E_{jke} = g(j,k,e)W'_{je}\sum_{jk}^{-1},$$

$$F_{jk} = \sum_{e\in\Omega_e} E_{jke}W_{je},$$

$$a_{jk} = \sum_{e\in\Omega_e} W'_{je}\sum_{jk}^{-1}\rho(j,k,e), \text{ and}$$

$$c_{ke} = \sum_{j\in\Omega_s}\sum_{jk}^{-1}\rho(j,k,e).$$

5. The method of claim 2 wherein step $b_4$ equations $$\sum_{e\in\Omega_e} E_{jke}b_{ke} + F_{jk}\mu_{jk} = a_{jk} \quad \forall j \in \Omega_s$$

and $$G_{ke}b_{ke} + \sum_{j\in\Omega_s} H_{jke}\mu_{jk} = c_{ke} \quad \forall e \in \Omega_e$$

are used for solving jointly and equation $$\sum_{jk} = \frac{\sum_{e\in\Omega_e}\sum_{r=1}^{R}\sum_{t=1}^{T^r}\gamma_t^r(j,k,e)\delta_t^r(j,k,e)(\delta_t^r(j,e,k))'}{\sum_{e\in\Omega_e} g(j,k,e)}$$

is used to determine variance and equations $Z_{je}^{(m)}=W_{je}^{(m)}R_{je}(m)$, $$Z_{je}^{(m,n)} \triangleq \sum_{k\in\Omega_m}\sum_{jk}^{-1(m,m)}\mu_{jk}^{(n)}\sum_{r=1}^{R}\sum_{t=1}^{T^r}\gamma_t^r(j,k,e)(o_t^r - b_{ke})^{(m)},$$

and $$R_{je}^{(p,n)}(m) \triangleq \sum_{k\in\Omega_m}\sum_{jk}^{-1(m,m)}\mu_{jk}^{(p)}\mu_{jk}^{(n)}\sum_{r=1}^{R}\sum_{t=1}^{T^r}\gamma_t^r(j,k,e).$$

are used to determine transformation.

6. A method of speech recognition comprising:

source normalization training for HMM modeling of speech comprising the steps of:
  (a) providing an initial model;
  (b) on said initial model or following new models performing the following steps to get a new model:
    $b_1$) estimation of intermediate quantities;
    $b_2$) performing re-estimation to determine initial state probability, transition probability, mixture component probability and environment probability;
    $b_3$) deriving mean vector and bias vector;
    $b_4$) solving jointly for mean vector and bias vector using linear equations and determining variances and transformation;
    $b_5$) replacing old model parameters for the calculated ones; and
  (c) determining after a new model is formed if it differs significantly from the previous model and if so repeating steps $b_1$–$b_5$;
receiving an input signal; and
comparing said input signal to said new model.

* * * * *